Nov. 6, 1934.  H. SCHNAKENBERG  1,979,907
EMERGENCY BRAKE LEVER
Filed Dec. 4, 1933

INVENTOR
Henry Schnakenberg.

UNITED STATES PATENT OFFICE 1,979,907

EMERGENCY BRAKE LEVER

Henry Schnakenberg, Honesdale, Pa.

Application December 4, 1933, Serial No. 700,782

1 Claim. (Cl. 74—531)

My invention relates to improvements in emergency brake levers for applying the brakes of automobiles.

The primary object of the invention is to provide a brake lever which will permit the brakes to be set and held in any position desired, so that the maximum braking power may be applied to the automobile.

This invention is an improvement of my prior Patent #1,905,951, especially in the simplifying and cheapening the cost of construction thereof.

A further object of the invention is to provide a device of the above mentioned character which is simple and durable in construction, reliable and efficient in operation and inexpensive to manufacture.

Other objects and advantages of the invention will become apparent during the course of the following description.

In the accompanying drawing, forming a part of this specification and in which like numerals of reference signify similar parts in the several views.

Figures 1, 2:
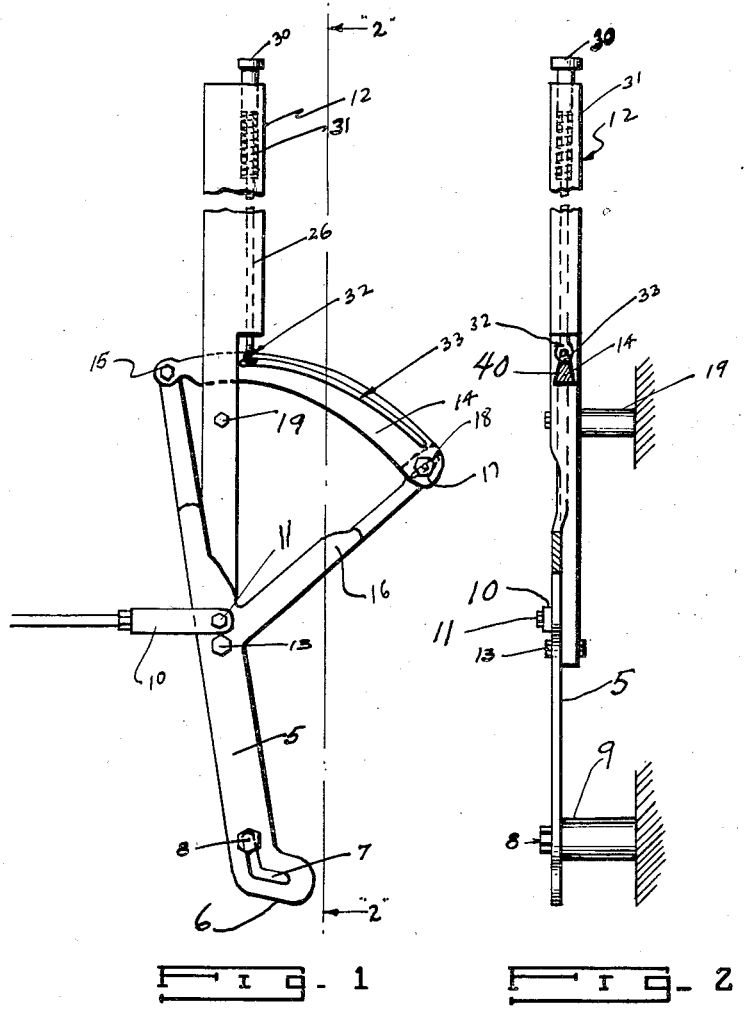
Fig. 1 is a side elevation view of the brake lever.
Fig. 2 is a vertical sectional view taken on lines 2—2 of Fig. 1.

In the drawing, wherein for the purpose of illustration, I have shown a preferred embodiment of my invention, the numeral 5 denotes a lever having an angular shaped lower end 6 provided with an angular slot 7 to receive the screw 8 which loosely and pivotally connects the lower end of the lever to the fixed bearing 9. The lever 5, intermediate the ends is connected to the brake rod 10 by the pivot pin 11 and also has connection with the lower end of the hand lever 12, by the pivot pin 13. A quadrant 14 is attached to the upper end of the lever 5, this quadrant being provided around its arcuate portion with an inverted V-shaped slot 40. The hand lever 12 extends upwardly above the quadrant 14 and it is pivotally connected to the fixed bearing 19. Within the hand lever 12 extends the release rod 26, same being upwardly tensioned by means of spring 31. Pushing in button 30, attached to the upper end of the release rod 26, releases the tension so that the wedge 32, which is mounted at the lower end of the release rod, will release its grip within the inverted V-shaped slot 40, so that the brake is released and adjustment can be made.

In operation, the brake lever is released by depressing the release rod 26 which moves the wedge 32 from tensional and frictional engagement within the V-shaped slot 40, so that the hand lever 12 is free to move along the quadrant 14. Movement of the hand lever 12 on its pivot or bearing 19 moves the lever 5 which in turn actuates the brake rod 10 and after the brakes have been applied to any degree of tension desired, the button 30 of the upper end of the release rod 26 is released by hand pressure, allowing it to assume its normal position thereby moving the wedge 32 into frictional engagement with the V-shaped slot 40, thus securely holding the brake lever in its adjusted position.

It is to be understood that the form of invention herewith shown and described is to be taken as a preferred example of the same and that certain changes in the shape, size and arrangement of the parts may be made without departing from the spirit of the invention or the scope of the subjoined claim.

Having thus described my invention, I claim:—

An emergency brake lever comprising a pivoted brake lever, a quadrant on the upper end of said lever, a hand lever pivotally connected at its lower end to said first mentioned lever, an inverted V-shaped slot around the arcuate edge of the quadrant, a locking wedge attached to said hand lever and engageable with the above mentioned inverted V-shaped slot, and releasable means for actuating said wedge to release same from frictional engagement with the edges of said slot.

HENRY SCHNAKENBERG.